(12) United States Patent
Huang

(10) Patent No.: US 9,961,707 B2
(45) Date of Patent: May 1, 2018

(54) TERMINAL MULTIPLE CONNECTION MANAGEMENT METHOD, DEVICE AND SYSTEM

(71) Applicant: ZTE CORPORATION, Shenzhen, Guangdong Province (CN)

(72) Inventor: Yada Huang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days. days.

(21) Appl. No.: 14/910,255

(22) PCT Filed: May 19, 2014

(86) PCT No.: PCT/CN2014/000511
§ 371 (c)(1),
(2) Date: Feb. 5, 2016

(87) PCT Pub. No.: WO2014/173184
PCT Pub. Date: Oct. 30, 2014

(65) Prior Publication Data
US 2016/0183322 A1 Jun. 23, 2016

(30) Foreign Application Priority Data
Aug. 9, 2013 (CN) .......................... 2013 1 0347448

(51) Int. Cl.
*H04W 76/00* (2018.01)
*H04W 76/02* (2009.01)
(Continued)

(52) U.S. Cl.
CPC ......... *H04W 76/025* (2013.01); *H04W 48/08* (2013.01); *H04W 40/248* (2013.01);
(Continued)

(58) Field of Classification Search
CPC ............... H04W 24/02; H04W 72/005; H04W 72/0453; H04W 74/004; H04W 74/008;
(Continued)

(56) References Cited

U.S. PATENT DOCUMENTS

2014/0362777 A1* 12/2014 Panchal .............. H04W 76/025
370/329
2016/0044565 A1* 2/2016 Lee ........................ H04W 48/20
370/331

FOREIGN PATENT DOCUMENTS

CN 101873715 A 10/2010
CN 102457970 A 5/2012
(Continued)

OTHER PUBLICATIONS

Samsung; Discussion on dual RRRC. 3GPP TSG-RAN WG2 Meeting #82; May 20-24, 2013, Fukuoka, Japan. R2-131830.

*Primary Examiner* — Allahyar Kasraian
(74) *Attorney, Agent, or Firm* — Ling Wu; Stephen Yang; Ling and Yang Intellectual Property

(57) ABSTRACT

The present document relates to the field of communication, provides a method, device and system for managing multi-connection of a terminal. The method includes: a source base station of a terminal controlling the terminal to establish a connection with at least one of other base stations and updating a path over which the terminal transmits data to passing through the source base station and the at least one of other base stations after the terminal has established the connection with the at least one of other base stations. The technical scheme provided by the embodiments of the present document is applicable to LTE systems, solves the problem of managing the multi-connection existing between the terminal and multiple base stations, and implements the management for the multi-connection of the terminal.

20 Claims, 7 Drawing Sheets

(51) Int. Cl.
*H04W 48/08* (2009.01)
*H04W 48/20* (2009.01)
*H04W 40/24* (2009.01)
*H04W 76/04* (2009.01)

(52) U.S. Cl.
CPC .......... *H04W 48/20* (2013.01); *H04W 76/021* (2013.01); *H04W 76/027* (2013.01); *H04W 76/04* (2013.01)

(58) Field of Classification Search
CPC .......... H04W 74/0833; H04W 76/025; H04W 76/04; H04W 76/028; H04W 76/046; H04W 72/0406
USPC .................. 455/445, 450–454; 370/329–333
See application file for complete search history.

(56) References Cited

FOREIGN PATENT DOCUMENTS

| | | |
|---|---|---|
| CN | 102695227 A | 9/2012 |
| CN | 103053201 A | 4/2013 |
| WO | 2013010418 A1 | 1/2013 |
| WO | 2013075602 A1 | 5/2013 |

\* cited by examiner

TERMINAL MULTIPLE CONNECTION MANAGEMENT METHOD, DEVICE AND SYSTEM

TECHNICAL FIELD

The present document relates to the field of communication, and more particularly, to a method, device and system for managing multi-connection of a terminal.

BACKGROUND OF THE RELATED ART

FIG. 1 is a schematic diagram of a general architecture of a long term evolution (LTE) system in prior art. As shown in FIG. 1, the LTE architecture (part of which is not shown) includes mobility management entities (MMEs), serving GetWays (SGWs), user equipment (UE) (called as terminals), base stations (eNodeBs, called eNBs for short), UU interfaces between the UEs and eNBs, S1 for the control plane (S1-MME) interfaces between the eNBs and MMEs, S1-U interfaces between the eNBs and SGWs and X2 interfaces between the eNBs.

The process in which the terminals establish calls includes the process in which control plane links and user plane links between the UE and eNBs and control plane links and user plane links between the eNBs and a core network (CN) are established. The user plane GTP-U data of different services on connections between the eNBs and core network is born by E-UTRAN radio access bearers (ERABs) and the control plane is born by connections between the eNBs and MMEs located in the core network; on the other hand, connections of the user plane between the eNBs and UE are born by a plurality of data radio bearers (DRBs) and connections of the control plane are born by a plurality of signaling radio bearers (SRBs).

At present, many operators and equipment manufacturers both tend to seek for new technical schemes for improving communication experience of users, especially for improving throughput capacity and mobile properties of user equipment, one of which is dual-connection/multi-connection (hereinafter collectively referred to as dual-connection). The dual connection means that the user equipment may use resources of at least two different network nodes at the same time. The at least two different network nodes and their functions in the dual-connection may not depend on functional characteristics of the network nodes. For example, the at least two different network nodes may both be traditional macro nodes or low power nodes, or one of them is a macro node and the other is a low power node. Considering that low power nodes are mostly deployed in hot spot areas covered with macro nodes and indoor covered area characteristics, the dual-connection scheme where the user equipment uses the resources of the macro nodes and the low power nodes simultaneously may be expected to improve communication experience of users to satisfy new mobile demands. With the occurrence of the dual-connection scheme, the user equipment needs to extend from using resources of only one network node at present to using resources of two or even more network nodes, that is, the user equipment needs to extend from being connected to only one network node at present to being connected to two or even more network nodes, which is bound to give a challenge for the management of the connected base stations, therefore, a new connection management scheme is required to be sought.

SUMMARY

The present document provides a method, device and system for managing multi-connection of a terminal, so as to solve the problem of managing multi-connection existing between the terminal and multiple base stations.

The present document provides a method for managing multi-connection of a terminal, comprising:

a source base station of a terminal controlling the terminal to establish a connection with at least one of other base stations; and updating a path over which the terminal transmits data to passing through the source base station and the at least one of other base stations after the terminal has established the connection with the at least one of other base stations.

Preferably, the source base station of the terminal controlling the terminal to access at least one of other base stations to establish a connection comprises:

the source base station acquiring corresponding information from the at least one of other base stations to generate a radio reconfiguration message and send the radio reconfiguration message to the terminal, indicating the terminal to access a newly-added cell under the at least one of other base stations; and the terminal accessing randomly the indicated newly-added cell according to indication of the radio reconfiguration message and sending a radio reconfiguration completion message to the source base station through a radio signaling bearer after accessing successfully.

Preferably, the source base station acquiring corresponding information from the at least one of other base stations to generate a radio reconfiguration message and send the radio reconfiguration message to the terminal comprises:

the source base station sending a base station adding request to the at least one of other base stations, the base station adding request carrying source side information which contains any one or more of the following: all or partial context information of the terminal at the source base station, ability information of the terminal, and signaling connection information and assistance information of the terminal at the source base station or a core network;

any one of the other base stations sending base station adding response information to the source base station after receiving the base station adding request, the base station adding response information carrying any one or more of the following: radio configuration information, measurement-related configuration information, and ground bearing configuration information of the other base station;

the source base station generating a radio reconfiguration message according to the base station adding response information sent by the other base station, sending the radio reconfiguration message, which carries a service of the terminal required to be transferred to the at least one of other base stations, an identifier of the at least one of other base stations and connection information of the newly-added cell, to the terminal through an air interface, indicating the terminal to establish a connection with the newly-added cell under the at least one of other base stations and transmits data of the service through the at least one of other base stations after the connection is established.

Preferably, the terminal accessing randomly the indicated newly-added cell according to indication of the radio reconfiguration message and sending a radio reconfiguration completion message to the source base station through a radio signaling bearer after accessing successfully comprises:

the terminal determining that the radio reconfiguration message is a radio reconfiguration message indicating multi-connection by a new radio reconfiguration message or a multi-connection identifier configured with respect to a new base station in the radio reconfiguration message;

the terminal accessing randomly the newly-added cell according to the indication of the radio reconfiguration message; and the terminal sending the radio reconfiguration completion message to the source base station through the radio signaling bearer after the terminal has successfully accessed randomly the newly-added cell.

Preferably, the source base station of the terminal controlling the terminal to establish a connection with the at least one of other base stations comprises:

the source base station acquiring corresponding information from the at least one of other base stations to generate a radio reconfiguration message and send the radio reconfiguration message to the terminal, indicating the terminal to access a newly-added cell under the at least one of other base stations; and the terminal receiving the radio reconfiguration message and accessing randomly the newly-added cell according to the radio reconfiguration message.

Preferably, the source base station acquiring corresponding information from the at least one of other base stations to generate a radio reconfiguration message and send the radio reconfiguration message to the terminal comprises:

the source base station sending a base station adding request to the at least one of other base stations, the base station adding request carrying source side information which contains any one or more of the following: all or partial context information of the terminal at the source base station, ability information of the terminal and signaling connection information and assistance information of the terminal at the source base station or a core network;

any one of the other base stations sending base station adding response information to the source base station after receiving the base station adding request, the base station adding response information carrying any one or more of the following: radio configuration information, measurement-related configuration information and ground bearing configuration information of the other base station;

the source base station generating a radio reconfiguration message according to the radio configuration information sent by the other base station, sending the radio reconfiguration message, which carries a service of the terminal required to be transferred to the at least one of other base stations, an identifier of the at least one of other base stations and connection information of the newly-added cell, to the terminal through an air interface, indicating the terminal to establish a connection with the newly-added cell under the at least one of other base stations and transmit data of the service through the at least one of other base stations after the connection is established.

Preferably, the terminal receiving the radio reconfiguration message and accessing randomly the newly-added cell according to the radio reconfiguration message comprises:

the terminal determining that the radio reconfiguration message is a radio reconfiguration message indicating multi-connection by a new radio reconfiguration message or a multi-connection identifier configured with respect to a new base station in the radio reconfiguration message; and the terminal accessing randomly the newly-added cell according to the indication of the radio reconfiguration message.

Preferably, the source base station of the terminal controlling the terminal to access a newly-added cell under the at least one of other base stations further comprises:

the source base station establishing corresponding ground bearers according to the ground bearer configuration after receiving the base station adding response information sent by the other base station.

Preferably, the source base station of the terminal controlling the terminal to access at least one of other base stations to establish a connection further comprises:

the source base station further establishing a corresponding data forward transmission bearer.

Preferably, after the step of the source base station generating a radio reconfiguration message according to the radio configuration information sent by the other base station, sending the radio reconfiguration message to the terminal through an air interface, indicating the terminal to establish a connection with the newly-added cell under the at least one of other base stations, the method further comprises:

the terminal sending a reconfiguration failure message to the source base station after the terminal fails to access.

Preferably, after the step of the terminal sending a reconfiguration failure message to the source base station after the terminal fails to access, the method further comprises:

the source base station remaining original ground configuration, initiating a subsequent recovery process, and deleting newly-added radio resource configuration and newly-added ground configuration on the at least one of other base stations.

Preferably, updating a path over which the terminal transmits data to passing through the source base station and the at least one of other base stations after the terminal has established the connection with the at least one of other base stations comprises:

any one of the other base stations sending a path altering request to a multi-stream gateway after confirming that the terminal has established the connection with the other base station successfully, the path altering request carrying an ID number of a service, the path of which is required to be altered, and/or an ID of a ground bearer resource; and the multi-stream gateway newly creating a ground data bearer with the other base station and sending a path altering request response message to the other base station.

Preferably, updating a path over which the terminal transmits data to passing through the source base station and the at least one of other base stations after the terminal has established the connection with the at least one of other base stations comprises:

the source base station completing path switching for the terminal internally and newly creating the ground data bearer with the other base station after confirming that the terminal has established the connection with the other base station successfully.

Preferably, the source base station of the terminal controlling the terminal to access a newly-added cell under the at least one of other base stations comprises:

the source base station acquiring the radio reconfiguration message and sending the radio reconfiguration message to the terminal, indicating the terminal to access the newly-added cell under the at least one of other base stations; and the terminal accessing randomly the indicated newly-added cell according to indication of the radio reconfiguration message and sending a radio reconfiguration completion message to the other base station corresponding to the randomly accessed newly-added cell through a radio signaling bearer after accessing successfully.

Preferably, the source base station acquiring the radio reconfiguration message and sending the radio reconfiguration message to the terminal, indicating the terminal to access the newly-added cell under the at least one of other base stations comprises:

the source base station sending a base station adding request to the at least one of other base stations, the base station adding request carrying source side information which contains: all or partial context information of the terminal at the source base station, ability information of the terminal and signaling connection information and assistance information of the terminal at the source base station or a core network;

any one of the other base stations establishing a new radio signaling bearer for a service of the terminal to be accepted after receiving the base station adding request, and generating a radio reconfiguration message;

the other base station sending base station adding response information to the source base station, the base station adding response information carrying the radio reconfiguration message and any one or more of the following: radio configuration information, measurement-related configuration information and ground bearing configuration information of the other base station;

the source base station sending the radio reconfiguration message, which carries a service of the terminal required to be transferred to the at least one of other base stations, an identifier of the at least one of other base stations and connection information of the newly-added cell, to the terminal through an air interface according to the radio configuration information sent by the other base station, indicating the terminal to establish a connection with the newly-added cell under the at least one of other base stations and transmit data of the service through the at least one of other base stations after the connection is established.

Preferably, the terminal accessing randomly the indicated newly-added cell according to indication of the radio reconfiguration message and sending a radio reconfiguration completion message to the other base station corresponding to the randomly accessed newly added cell through a radio signaling bearer after accessing successfully comprises:

the terminal determining that the radio reconfiguration message is a radio reconfiguration message indicating multi-connection by a new radio reconfiguration message or a multi-connection identifier configured with respect to a new base station in the radio reconfiguration message;

the terminal accessing randomly the newly-added cell according to the indication of the radio reconfiguration message; and the terminal sending the radio reconfiguration completion message to the other base station through the radio signaling bearer after the terminal has successfully accessed randomly the newly-added cell.

Preferably, the source base station of the terminal controlling the terminal to access a newly-added cell under the at least one of other base stations further comprises:

the source base station establishing corresponding ground bearers according to the ground bearer configuration after receiving the base station adding response information sent by the other base station.

Preferably, the source base station of the terminal controlling the terminal to access a newly-added cell under the at least one of other base stations further comprises:

the source base station further establishing a corresponding data forward transmission bearer.

Preferably, updating a path over which the terminal transmits data to passing through the source base station and the at least one of other base stations after the terminal has established the connection with the at least one of other base stations comprises:

any one of the other base stations sending a path altering request to the source base station after confirming that the terminal has established the connection with the other base station successfully, the path altering request carrying an ID number of a service, the path of which is required to be altered, and/or an ID of a ground bearer resource;

the source base station forwarding the path altering request to a corresponding core network or multi-stream gateway; and the core network or multi-stream gateway newly creating a ground data bearer with the other base station and sending a path altering request response message to the source base station.

Preferably, updating a path over which the terminal transmits data to passing through the source base station and the at least one of other base stations after the terminal has established the connection with the at least one of other base stations comprises:

any one of the other base stations, which receives the radio reconfiguration completion message sent by the terminal, forwarding the radio reconfiguration completion message to the source base station; and the source base station completing path switching for the terminal internally and newly creating the ground data bearer with the other base station after confirming that the terminal has established the connection with the other base station successfully.

Preferably, before the step of the source base station of the terminal controlling the terminal to establish a connection with the at least one of other base stations, the method further comprises:

the source base station triggering a process of adding one or more other base stations for the terminal to perform multi-connection transmission.

The present document further provides a method for managing multi-connection of a terminal, comprising:

a terminal accepting control of a source base station to establish a connection with at least one of other base stations.

Preferably, a terminal accepting control of a source base station to establish a connection with at least one of other base stations comprises:

the terminal receiving a radio reconfiguration message sent by the source base station, the radio reconfiguration message indicating the terminal to access a newly-added cell under the at least one of other base stations; and the terminal accessing randomly the newly-added cell according to indication of the radio reconfiguration message and sending a radio reconfiguration completion message to the source base station through a radio signaling bearer after accessing successfully.

Preferably, the terminal accessing randomly the newly-added cell according to indication of the radio reconfiguration message and sending a radio reconfiguration completion message to the source base station through a radio signaling bearer after accessing successfully comprises:

the terminal determining that the radio reconfiguration message is a radio reconfiguration message indicating multi-connection by a new radio reconfiguration message or a multi-connection identifier configured with respect to a new base station in the radio reconfiguration message;

the terminal accessing randomly the newly-added cell according to the indication of the radio reconfiguration message; and the terminal sending the radio reconfiguration completion message to the source base station through the radio signaling bearer after the terminal has successfully accessed randomly the newly-added cell.

Preferably, a terminal accepting control of a source base station to establish a connection with at least one of other base stations comprises:

the terminal receiving a radio reconfiguration message sent by the source base station, the radio reconfiguration message indicating the terminal to access a newly-added cell under the at least one of other base stations; and the terminal accessing randomly the newly-added cell according to the radio reconfiguration message.

Preferably, the terminal receiving the radio reconfiguration message and accessing randomly the newly-added cell according to the radio reconfiguration message comprises:

the terminal determining that the radio reconfiguration message is a radio reconfiguration message indicating multi-connection by a new radio reconfiguration message or a multi-connection identifier configured with respect to a new base station in the radio reconfiguration message; and the terminal accessing randomly the newly-added cell according to the indication of the radio reconfiguration message.

Preferably, a terminal accepting control of a source base station to establish a connection with at least one of other base stations comprises:

the terminal receiving a radio reconfiguration message sent by the source base station, the radio reconfiguration message indicating the terminal to access a newly-added cell under the at least one of other base stations; and the terminal accessing randomly the newly-added cell according to indication of the radio reconfiguration message and sending a radio reconfiguration completion message to the other base station corresponding to the randomly accessed newly-added cell through a radio signaling bearer after accessing successfully.

Preferably, the terminal accessing randomly the newly-added cell according to the indication of the radio reconfiguration message and sending a radio reconfiguration completion message to the other base station corresponding to the randomly accessed newly-added cell through a radio signaling bearer after accessing successfully comprises:

the terminal determining that the radio reconfiguration message is a radio reconfiguration message indicating multi-connection by a new radio reconfiguration message or a multi-connection identifier configured with respect to a new base station in the radio reconfiguration message;

the terminal accessing randomly the newly-added cell according to the indication of the radio reconfiguration message; and the terminal sending the radio reconfiguration completion message to the other base station through the radio signaling bearer after the terminal has successfully accessed randomly the newly-added cell.

Preferably, the radio reconfiguration message carries a service of the terminal required to be transferred to the at least one of other base stations, an identifier of the at least one of other base stations and connection information of the newly-added cell to indicate the terminal to establish a connection with the newly-added cell under the at least one of other base stations and transmit data of the service through the at least one of other base stations after the connection is established.

Preferably, after the step of the terminal accessing randomly the newly-added cell according to the indication of the radio reconfiguration message, the method further comprises:

the terminal sending a reconfiguration failure message to the source base station after the terminal fails to access.

The present document provides a system for managing multi-connection of a terminal, which comprises a terminal, a source base station where the terminal is located, at least one of other base stations and a management apparatus;

the source base station is configured to control the terminal to establish a connection with the at least one of other base stations; and the management apparatus is configured to update a path over which the terminal transmits data to passing through the source base station and the at least one of other base stations after the terminal has established the connection with the at least one of other base stations.

Preferably, the management apparatus is the source base station or a multi-stream gateway or a core network.

Preferably, the source base station is configured to acquire corresponding information from the at least one of other base stations to generate a radio reconfiguration message and send the radio reconfiguration message to the terminal, indicate the terminal to access a newly-added cell under the at least one of other base stations; and the terminal is configured to access randomly the indicated newly-added cell according to indication of the radio reconfiguration message and send a radio reconfiguration completion message to the source base station through a radio signaling bearer after accessing successfully.

Preferably, the source base station is configured to send a base station adding request to the at least one of other base stations, wherein the base station adding request carries source side information which contains any one or more of the following: all or partial context information of the terminal at the source base station, ability information of the terminal and signaling connection information and assistance information of the terminal at the source base station or a core network;

and generate a radio reconfiguration message according to the radio configuration information sent by the other base station and send the radio reconfiguration message, which carries a service of the terminal required to be transferred to the at least one of other base stations, an identifier of the at least one of other base stations and connection information of the newly-added cell, to the terminal through an air interface, indicate the terminal to establish a connection with the newly-added cell under the at least one of other base stations and transmit data of the service through the at least one of other base stations after the connection is established; and any one of the other base stations is configured to send base station adding response information to the source base station after receiving the base station adding request, wherein the base station adding response information carries the radio configuration information which contains any one or more of the following: dedicated radio resource allocation information, public radio configuration information, measurement-related configuration information and ground bearing configuration information of the other base station.

Preferably, the source base station is configured to acquire corresponding information from the at least one of other base stations to generate a radio reconfiguration message and send the radio reconfiguration message to the terminal, indicate the terminal to access a newly-added cell under the at least one of other base stations; and the terminal is configured to receive the radio reconfiguration message and access randomly the newly-added cell according to the radio reconfiguration message.

Preferably, the source base station is configured to send a base station adding request to the at least one of other base stations, wherein the base station adding request carries source side information which contains any one or more of the following: all or partial context information of the terminal at the source base station, ability information of the terminal and signaling connection information and assistance information of the terminal at the source base station or a core network, and generate a radio reconfiguration message according to the radio configuration information sent by the other base station and send the radio reconfiguration message, which carries a service of the terminal required to be transferred to the at least one of other base stations, an identifier of the at least one of other base stations and connection information of the newly-added cell, to the terminal through an air interface, indicate the terminal to establish a connection with the newly-added cell under the at least one of other base stations and transmit data of the service through the at least one of other base stations after the connection is established; and any one of the other base stations is configured to send base station adding response information to the source base station after receiving the base station adding request, wherein the base station adding response information carries the radio configuration information which contains any one or more of the following: dedicated radio resource allocation information, public radio configuration information, measurement-related configuration information and ground bearing configuration information of the other base station.

Preferably, any one of the other base stations is further configured to send a path altering request to the management apparatus after confirming that the terminal has established the connection with the other base station successfully and send the path altering request to the management apparatus, wherein the path altering request carries an ID number of a service, the path of which is required to be altered, and/or an ID of a ground bearer resource; and the management apparatus is configured to newly create a ground data bearer with the other base station and send a path altering request response message to the other base station.

Preferably, the management apparatus is configured to complete path switching for the terminal internally and newly create the ground data bearer with the other base station after confirming that the terminal has established the connection with the other base station successfully.

Preferably, the source base station is configured to acquire the radio reconfiguration message and send the radio reconfiguration message to the terminal, indicate the terminal to access the newly-added cell under the at least one of other base stations; and the terminal is configured to access randomly the indicated newly-added cell according to indication of the radio reconfiguration message and send a radio reconfiguration completion message to the other base station corresponding to the randomly accessed newly-added cell through a radio signaling bearer after accessing successfully.

Preferably, the source base station is configured to send a base station adding request to the at least one of other base stations, wherein the base station adding request carries source side information which contains: all or partial context information of the terminal at the source base station, ability information of the terminal and signaling connection information and assistance information of the terminal at the source base station or a core network;

any one of the other base stations is configured to establish a new radio signaling bearer for a service of the terminal to be accepted after receiving the base station adding request, and generate a radio reconfiguration message, and send the radio reconfiguration message, which carries a service of the terminal required to be transferred to the at least one of other base stations, an identifier of the at least one of other base stations and connection information of the newly-added cell, to the terminal through an air interface according to the radio configuration information sent by the other base station, indicate the terminal to establish a connection with the newly-added cell under the at least one of other base stations and transmit data of the service through the at least one of other base stations after the connection is established; and the other base station is configured to send base station adding response information to the source base station, wherein the base station adding response information carries the radio configuration information and the radio reconfiguration message, the radio configuration information contains dedicated radio resource allocation information, public radio configuration information, measurement-related configuration information and ground bearing configuration information of the other base station.

Preferably, any one of the other base stations is further configured to send a path altering request to the source base station after confirming that the terminal has established the connection with the other base station successfully, wherein the path altering request carries an ID number of a service, the path of which is required to be altered, and/or an ID of a ground bearer resource;

the source base station is further configured to forward the path altering request to the management apparatus; and the management apparatus is configured to newly create a ground data bearer with the other base station and send a path altering request response message to the source base station.

Preferably, any one of the other base stations is configured to forward a radio reconfiguration completion message sent by the terminal after receiving the radio reconfiguration completion message; and the management apparatus is configured to complete path switching for the terminal internally and newly create the ground data bearer with the other base station after confirming that the terminal has established the connection with the other base station successfully.

Preferably, the source base station is further configured to create corresponding ground bearers according to the ground bearing configuration and create a corresponding data forward transmission bearer after receiving the base station adding response information sent by the other base station.

The present document further provides a device for managing multi-connection of a terminal, comprising:

a multi-connection establishing module, configured to accept control of a source base station to establish a connection with at least one of other base stations.

Preferably, the multi-connection establishing module comprises:

a first configuration receiving unit, configured to receive a radio reconfiguration message sent by the source base station, wherein the radio reconfiguration message indicates the terminal to access a newly-added cell under the at least one of other base stations; and a first access executing unit, configured to access randomly the newly-added cell according to indication of the radio reconfiguration message and send a radio reconfiguration completion message to the source base station through a radio signaling bearer after accessing successfully.

Preferably, the first access executing unit comprises:

a first multi-connection confirming sub-unit, configured to determine that the radio reconfiguration message is a radio reconfiguration message indicating multi-connection by a new radio reconfiguration message or a multi-connection identifier configured with respect to a new base station in the radio reconfiguration message;

a first random access sub-unit, configured to access randomly the newly-added cell according to the indication of the radio reconfiguration message; and a first configuration completion message sending unit, configured to send the radio reconfiguration completion message to the source base station through a radio signaling bearer after the newly-added cell has been accessed randomly successfully.

Preferably, the multi-connection establishing module comprises:

a second configuration receiving unit, configured to receive a radio reconfiguration message sent by the source base station, wherein the radio reconfiguration message indicates the terminal to access a newly-added cell under the at least one of other base stations; and a second access executing unit, configured to access randomly the newly-added cell according to the radio reconfiguration message.

Preferably, the second access executing unit comprises:

a second multi-connection confirming sub-unit, configured to determine that the radio reconfiguration message is a radio reconfiguration message indicating multi-connection by a new radio reconfiguration message or a multi-connection identifier configured with respect to a new base station in the radio reconfiguration message; and a second random access sub-unit, configured to access randomly the newly-added cell according to the indication of the radio reconfiguration message.

Preferably, the multi-connection establishing module comprises:

a third configuration receiving unit, configured to receive a radio reconfiguration message sent by the source base station, wherein the radio reconfiguration message indicates the terminal to access a newly-added cell under the at least one of other base stations; and a third access executing unit, configured to access randomly the newly-added cell according to indication of the radio reconfiguration message and send a radio reconfiguration completion message to the other base station corresponding to the randomly accessed newly-added cell through a radio signaling bearer after accessing successfully.

Preferably, the third access executing unit comprises:

a third multi-connection confirming sub-unit, configured to determine that the radio reconfiguration message is a radio reconfiguration message indicating multi-connection by a new radio reconfiguration message or a multi-connection identifier configured with respect to a new base station in the radio reconfiguration message;

a third random access sub-unit, configured to access randomly the newly-added cell according to the indication of the radio reconfiguration message; and a third configuration completion message sending unit, configured to send the radio reconfiguration completion message to the other base station through the radio signaling bearer after the terminal has successfully accessed randomly the newly-added cell.

Embodiments of the present document provide a method, device and system for managing multi-connection of a terminal, a source base station of a terminal controls the terminal to establish a connection with at least one of other base stations and updates a path over which the terminal transmits data to passing through the source base station and the at least one of other base stations after the terminal has established the connection with the at least one of other base stations, thereby implementing the management for the multi-connection of the terminal and solving the problem of managing the multi-connection existing between the terminal and multiple base stations.

PREFERRED EMBODIMENTS OF THE INVENTION

With the occurrence of the dual-connection scheme, the user equipment needs to extend from using resources of only one network node at present to using resources of two or even more network nodes, that is, the user equipment needs to extend from being connected to only one network node at present to being connected to two or even more network nodes, which is bound to give a challenge for the management of the connected base stations, therefore, a new connection management scheme is required to be sought.

In order to solve the problem described above, the embodiments of the present document provide a method, device and system for managing multi-connection of a terminal. The embodiments of the present document will be described in detail in conjunction with the accompanying drawings. It is should be noted that the embodiments in the present document and various features in the embodiments can be combined with each other arbitrarily without conflict.

Figure 1:
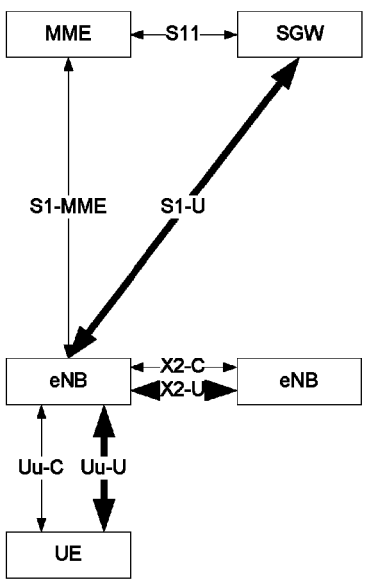
FIG. 1 is a schematic diagram of a general architecture of a long term evolution (LTE) system in prior art.
Figure 2:
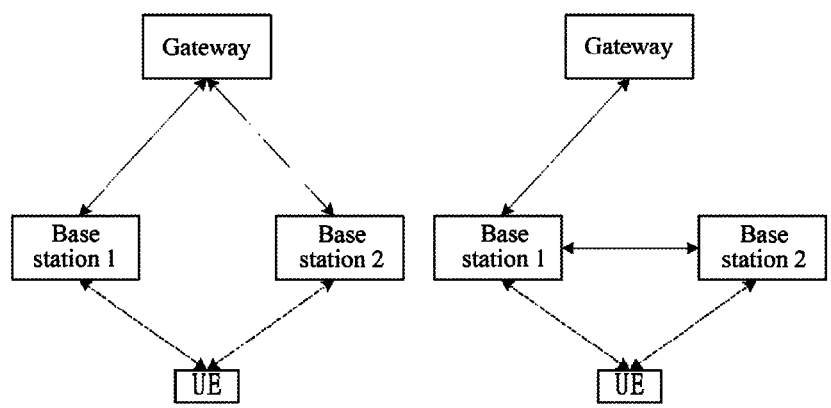
FIG. 2 is a schematic diagram of two basic multi-stream architectures.

FIG. 2 is a schematic diagram of two basic multi-stream architectures. Basically, multi-stream can be divided into two types, one is a multi-stream gateway, i.e., downlink data is divided into multiple data streams at the multi-stream gateway to distribute to a plurality of base stations and then a terminal collects data from each of the base stations; on the contrary, uplink data is sent by the terminal to the plurality of base stations, is forwarded by the base stations to the multi-stream gateway and finally is collected by the multi-stream gateway. The multi-stream gateway may be a network element between a core network and a base station or may be a gateway of the core network. As to the other type, downlink data from the core network is distributed by one of the base stations to the plurality of base stations and the terminal collects data from these base stations; while uplink data is sent by the terminal to the plurality of base stations and then all of the base stations send the data to an aggregation base station, which collects the data together to send to the core network, i.e., one of the base stations functions as the multi-stream gateway.

In all multi-stream architectures, the base stations are divided into primary base stations and secondary base stations in terms of function. The interface between the primary base station and the terminal has a complete protocol stack of a control plane and user plane, and has the same function as ordinary base stations and can work separately. Moreover, the interface between the secondary base station and the terminal has two choices, one is that there is only a user plane interface between the secondary base station and the terminal and all control plane signaling is sent by the primary base station; the other is that there is a control plane interface between the secondary base station and the terminal as well such that direct communication of the control signaling can be performed. The embodiments of the present document will define a process for establishing multi-connection for the two choices.

The base station standard of multi-connection has no influence on the embodiments of the present document, i.e., it may be LET FDD, LTE TDD, WCDMA, TD-SCDMA, GSM or even WiFi, and the only limitation is that a plurality of base stations are required to be interoperable. In addition, the types of the plurality of base stations are not limited, and they may be macro base stations, micro base stations, hot spots. Coverages where the terminal is connected to the plurality of base stations simultaneously should be overlapping or partial overlapping.

The First Embodiment of the Present Document

The embodiment of the present document provides a method for managing multi-connection of a terminal. In the embodiment of the present document, by way of example, a management apparatus is an independent multi-stream gateway, a source base station is a base station 1, and the other base station is a base station 2. The base station 1 controls the terminal to establish a connection with the base station 2, and the multi-stream gateway updates a path over which the terminal transmits data to passing through the base station 1 and the base station 2 after the terminal has established the connection with the base station 2.

The terminal establishes a connection with a cell 1 on the base station 1. The base station 1 needs to add a base station for the terminal for multi-connection transmission based on an algorithm decision. There may be many possibilities for the algorithm decision. For example, the terminal reports a measurement report, finds that a new cell satisfies a certain signal quality threshold, if the terminal is a terminal with multi-connection ability and the base station 1 and the base station 2 to be added may also implement the multi-connection, then the base station 1 may trigger to add the base station 2 to perform the multi-connection transmission with the terminal together. As for another typical algorithm or the demand of load balance based on load situations of the base station 1 itself, the base station 1 may trigger to balance portion of data to the base station 2 to perform the multi-connection transmission with the terminal together after confirming that the terminal is within a cell coverage area under the base station 2 (as with measurement feedback of the coverage cell or the terminal) and the multi-connection ability of each of the base stations and the terminal. Only two typical algorithm triggering conditions are described above and are used for description of scheme integrity, depending on the implementation of each of the base stations. The embodiment of the present document does not depend on the triggering cause and thus is not limited, and this will not be repeated in the subsequent other embodiments of the present document.

Figure 3:
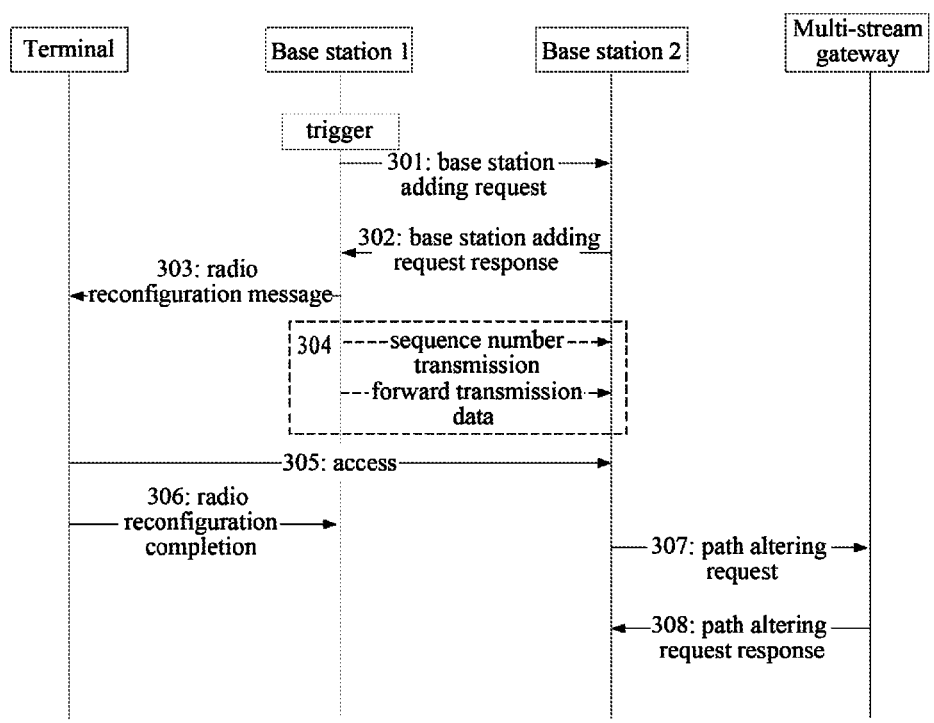
FIG. 3 is a flow chart of a method for managing multi-connection of a terminal in accordance with the first embodiment of the present document.

A process where a terminal establishes multiple data transmission paths implemented by using a method for managing multi-connection of the terminal provided by the embodiment of present document is as shown in FIG. 3 and comprises the following steps.

In step 301, the base station 1 sends a base station adding request to the base station 2. The base station adding request carries necessary source side information to prepare multi-connection transmission at the base station 2 side. The source side information contains any one or more of all or partial context information of the terminal at the source base station, ability information of the terminal and signaling connection information and assistance information of the terminal at the source base station or a core network. Specifically, the carried source side information includes but is not limited to all or partial context information of the terminal at the base station 1, such as configuration information of E-RAB in LTE, including E-RAB transport layer address, QoS information, etc.; ability information of the terminal; signaling connection information of the terminal at the base station 1 or a core network and some other assistance information, for assisting the base station 2 in completing the associated configuration, such as a target cell of a connection point desired by the terminal, RRM information of the terminal, measurement information, the current measurement configuration, etc.

Compared with the traditional LTE systems in which a switching source cell needs to transfer all context to a target cell, since there are connections between both the base station 1 and the base station 2 and the terminal, all context of the terminal is not required to be carried when a new base station is added and the related information is not required to be recreated either after the configuration fails. The base station 1 only needs to send service information and configuration information associated with the base station 2 to the base station 2.

In step 302, after receiving the base station adding request sent by the base station 1, the base station 2 first performs acceptance control and checks whether there are enough resources to accept a service of the multi-connected terminal, if yes, the subsequent process is executed; otherwise, the base station 2 sends base station adding request response information to the base station 1 to inform the base station 1 of the failure of adding the base station.

When preparing response resources, the base station 2 configures the corresponding dedicated radio resources according to its carried service QoS requirement. The dedicated radio resource configuration information includes air interface protocol stack setting, dedicated resources (such as possible dedicated PUCCH resources and sounding resources which will be configured in the LTE) and also possibly includes dedicated random access resources. The public radio configuration information, which includes public channel or shared channel configuration information, is also included.

Some measurement related configuration information or measurement related secondary configuration information may also be included. This measurement information may be modified based on the secondary information carried in step 301, such as on the base of the original measurement information. For example, a new measurement ID may use an ID which is not used in the original measurement configuration. For others such as measurement object may report configuration, whether to newly add can be decided based on whether there is the configuration in the original measurement configuration, or the original configuration is cited directly or the original configuration is modified, thereby avoiding repeated configuration of the measurement and repeated use of the corresponding ID. If the measurement configuration information is not carried in step 301, the base station 2 may set the related measurement configuration according to its own demand and send it back to the base station 1, and repetition is eliminated by the base station 1 according to the configuration of the base station 2 to adjust the measurement configuration information sent to the terminal eventually.

In addition, the base station 2 needs to configure a ground bearer corresponding to the service of the terminal, such as tunnel configuration of the E-RAB in the LTE and possible uplink and downlink forward transmission tunnel configuration of the corresponding service, to transmit forward uplink and downlink data unfinished by an air interface to the base station 2 for continuous transmission during the transfer of the service from the base station 1 to the base station 2.

After completing the configuration described above, the base station 2 sends the radio configuration information of the terminal and the ground configuration information required by the base station 1 through information carried by the base station adding request response which carries any one or more of radio configuration information, measurement-related configuration information and ground bearing configuration information of the other base station.

In step 303, after the base station 1 receives the response information, the base station 1 generates a radio reconfiguration message (such as a RRC reconfiguration message of the LTE) based on the radio configuration of the base station 2 in combination with factors such as radio configuration and reconfiguration situations of the base station 1 and the radio configuration of the current terminal. Optionally, the radio reconfiguration message is sent directly to the terminal via an air interface after it is protected in terms of integrity and is encrypted. If the base station 2 has assembled the radio configuration into a complete radio reconfiguration message, then the radio reconfiguration message is sent directly to the terminal via the air interface after it is protected in terms of integrity and is encrypted optionally. The radio reconfiguration command carries a service of the terminal required to be transferred to at least one of other base stations, an identifier of the at least one of other base stations and connection information of a newly added cell, to indicate the terminal to establish a connection with the newly-added cell under the at least one of other base stations and transmit data of the service through the at least one of other base stations after the connection is established.

In step 304, the base station 1 creates a corresponding E-RAB ground bearer and an optional data forward transmission bearer based on the radio configuration sent by the base station 2 received in step 303. If there is unsent data which needs to be transmitted forward to the base station 2, the base station 1 will send it to the base station 2 via a forward transmission tunnel and inform the base station 2 of the unfinished data sequence number state via a signaling channel, which is similar to switching in the switching process of the LTE.

In step 305, the terminal accesses randomly the indicated cell according to indication of the radio reconfiguration message. Specifically, according to the signaling indication, the terminal configures the corresponding service and radio bearer after receiving the radio reconfiguration message sent by the base station 1 in step 303. When the terminal knows this is a multi-connection reconfiguration through a new radio reconfiguration message or a multi-connection identifier configured with respect to a new base station (e.g., adding a base station configuration information element) in the radio reconfiguration, the terminal needs to connect with the cell under the new base station. The terminal connects with the newly-added cell according to the connection information indicating the newly-added cell in the configuration, e.g., accesses randomly the newly-added cell after synchronizing with the newly-added cell.

In step 306, the terminal sends a radio reconfiguration completion message to the source base station through a radio signaling bearer after accessing successfully. The terminal sends the radio reconfiguration completion message to the base station 1 through the radio signaling bearer after accessing randomly the designated cell under the newly-added base station successfully. After receiving the message, the base station 1 confirms that the terminal has completed the reconfiguration. The base station 1 may update the final configuration. If the terminal fails in step 305, it can send a reconfiguration failure message to the base station 1. The base station 1 initiates the subsequent restoration process, deletes the newly-added radio resources and the newly-added ground configuration on the base station 2 and then remains the original ground configuration.

In step 307, the base station 2 sends a path altering request to the multi-stream gateway after confirming that the terminal has accessed successfully (e.g., random access is successful) in step 305. The path altering request carries an ID number of a service, the path of which is required to be altered, or an ID of the corresponding ground bearer resource. For example, a ground bearer protocol stack structure of the LTE carries downlink GTP-U TED information and response IP address information sent by the base station 2 in step 303.

In step 308, the multi-stream gateway newly creates a ground data bearer with the base station 2, for example, saves the ground bearing information of the base station 2 in step 307, sends corresponding uplink ground bearing information to the base station 2 through a path altering request response message, and sends the established service data stream to the base station 2 from to the original base station 1. The base station 2 sends the received uplink data stream to the multi-stream gateway after receiving the response message.

The Second Embodiment of the Present Document

The embodiment of the present document provides a method for managing multi-connection of a terminal. In the embodiment of the present document, by way of example, a management apparatus is an independent multi-stream gateway, a source base station is a base station 1, and the other base station is a base station 2. The base station 1 controls the terminal to establish a connection with the base station 2, and the multi-stream gateway updates a path over which the terminal transmits data to passing through the base station 1 and the base station 2 after the terminal has established the connection with the base station 2.

Similar to the first embodiment of the present document, based on a triggering condition of multi-stream, such as a measurement report, the newly-added base station 2 is triggered to perform multi-stream transmission.

Figure 4:
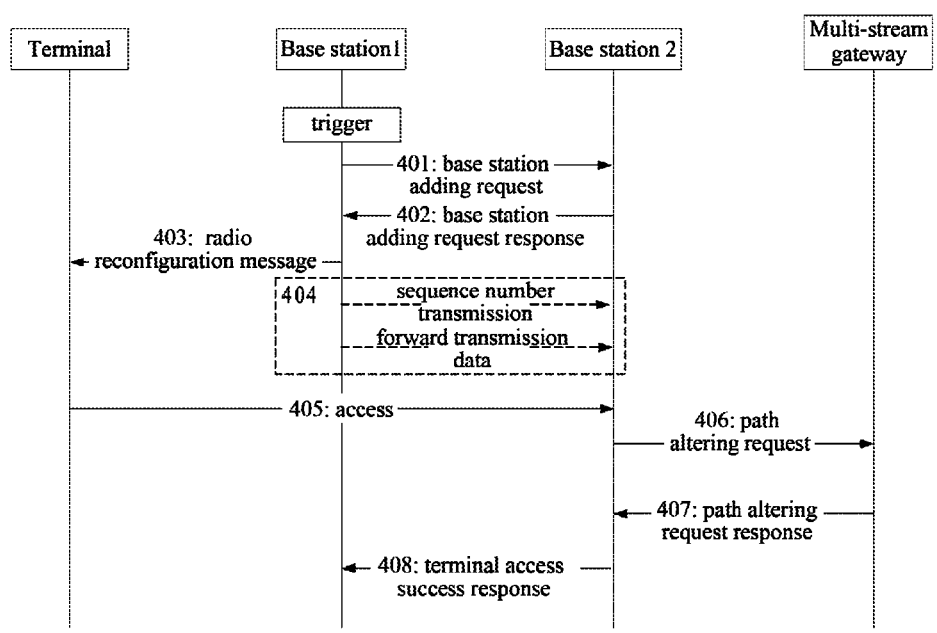
FIG. 4 is a flow chart of a method for managing multi-connection of a terminal in accordance with the second embodiment of the present document.

A process where a terminal establishes multiple data transmission paths implemented by using a method for managing multi-connection of the terminal provided by the embodiment of present document is as shown in FIG. 4 and comprises the following steps.

In step 401, the base station 1 sends a base station adding request to the base station 2. The base station adding request carries necessary source side information to prepare multi-connection transmission at the base station 2 side. The source side information contains any one or more of all or partial context information of the terminal at the source base station, ability information of the terminal and signaling connection information and assistance information of the terminal at the source base station or a core network.

Specifically, the carried source side information includes but is not limited to all or partial context information of the terminal at the base station 1, such as configuration information of E-RAB in LTE, including E-RAB transport layer address, QoS information, etc.; ability information of the terminal; signaling connection information of the terminal at the base station 1 or a core network and some other assistance information, for assisting the base station 2 in completing the associated configuration, such as a target cell of a connection point desired by the terminal, RRM information of the terminal, measurement information, the current measurement configuration, etc.

In step 402, after receiving the base station adding request sent by the base station 1, the base station 2 first performs acceptance control and checks whether there are enough resources to accept a service of the multi-connected terminal, if yes, the subsequent process is executed; otherwise, the base station 2 sends base station adding request response to the base station 1 to inform the base station 1 of the failure of adding the base station. Similar to the first embodiment of the present document, the base station 2 prepares response resources and confirms response configuration, including dedicated physical layer resource confirmation, ground configuration and measurement configuration. After completing the configuration described above, the base station 2 sends the base station adding request response which carries any one or more of radio configuration information, measurement-related configuration information and ground bearing configuration information of the other base station to the base station 1.

In step 403, after the base station 1 receives the base station adding request response, the base station 1 generates a radio reconfiguration message (such as the existing reusable RRC reconfiguration message of the LTE or a new configuration message) based on the radio configuration of the base station 2 in combination with factors such as radio configuration and reconfiguration situations of the base station 1 and the radio configuration of the current terminal. Optionally, the radio reconfiguration message is sent directly to the terminal via an air interface after it is protected in terms of integrity and is encrypted. The radio reconfiguration command carries a service of the terminal required to be transferred to at least one of other base stations, an identifier of the at least one of other base stations and connection information of a newly-added cell, to indicate the terminal to establish a connection with the newly-added cell under the at least one of other base stations and transmit data of the service through the at least one of other base stations after the connection is established.

In step 404, the base station 1 creates a corresponding E-RAB ground bearer and an optional data forward transmission bearer based on the radio configuration sent by the base station 2 in step 403. If there is unsent data which needs to be transmitted forward to the base station 2, the base station 1 will send it to the base station 2 via a forward transmission tunnel and inform the base station 2 of the unfinished data sequence number state via a signaling channel, which is similar to switching in the switching process of the LTE.

In step 405, the terminal receives the radio reconfiguration message and accesses randomly the newly-added cell according to the radio reconfiguration message. Specifically, the terminal receives the radio reconfiguration message sent by the base station 1 in step 403 and configures the corresponding service and radio bearer according to signaling indication. When the terminal knows this is a multi-connection reconfiguration by a new radio reconfiguration message or an ID configured with respect to a new base station in the radio reconfiguration, the terminal needs to connect with the cell under the new base station. The terminal connects with the newly-added cell according to the connection information indicating the newly-added cell in the configuration, e.g., accesses randomly the newly-added cell after synchronizing with the newly-added cell.

In step 406, the base station 2 sends a path altering request to the multi-stream gateway after confirming that the terminal has accessed successfully (e.g., random access is successful) in step 405. The path altering request carries an ID number of a service, the path of which is required to be altered, or an ID of the corresponding ground bearer resource. For example, a ground bearer protocol stack structure of the LTE carries downlink GTP-U TED information and response corresponding IP address information sent by the base station 2 in step 403.

In step 407, the multi-stream gateway newly creates a ground data bearer with the base station 2, for example, saves the ground bearing information of the base station 2 in step 407, sends corresponding uplink ground bearing information to the base station 2 through a path altering request response message, and sends the established service data stream to the base station 2 from to the original base station 1. The base station 2 sends the received uplink data stream to the multi-stream gateway after receiving the path altering request response message.

In step 408, after the process is completed, the base station 2 sends a terminal access success response to the base station 1 to inform the base station 1 of the success of the entire multi-connection adding process. The base station 1 updates the corresponding configuration.

The Third Embodiment of the Present Document

The embodiment of the present document provides a method for managing multi-connection of a terminal. In the embodiment of the present document, by way of example, a management apparatus is an independent multi-stream gateway, a source base station is a base station 1, and the other base station is a base station 2. The base station 1 controls the terminal to establish a connection with the base station 2, and the multi-stream gateway updates a path over which the terminal transmits data to passing through the base station 1 and the base station 2 after the terminal has established the connection with the base station 2.

Similar to the first embodiment of the present document, based on a triggering condition of multi-stream, such as a measurement report, the newly-added base station 2 is triggered to perform multi-stream transmission.

Figure 5:
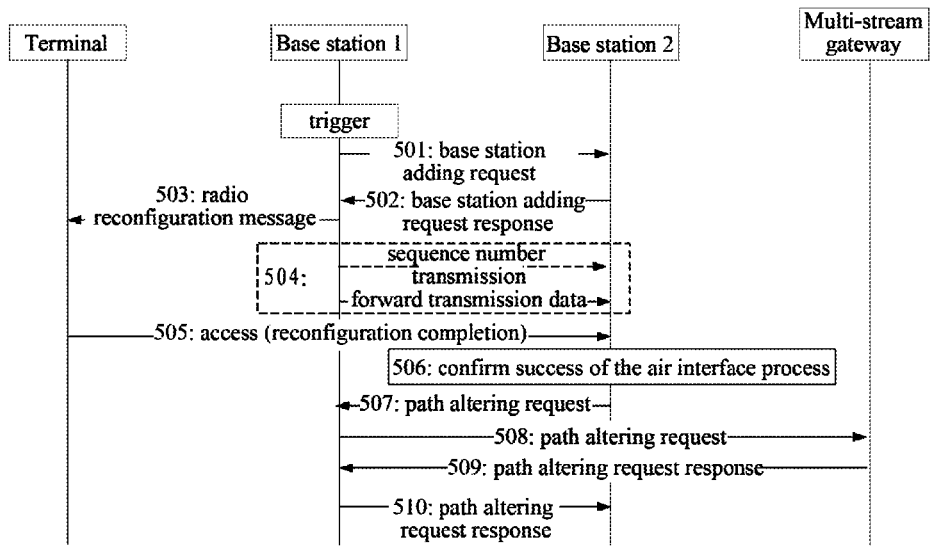
FIG. 5 is a flow chart of a method for managing multi-connection of a terminal in accordance with the third embodiment of the present document.

A process where a terminal establishes multiple data transmission paths implemented by using a method for managing multi-connection of the terminal provided by the embodiment of present document is as shown in FIG. 5 and comprises the following steps.

In step 501, the base station 1 sends a base station adding request to the base station 2. The base station adding request carries necessary information to prepare multi-connection transmission at the base station 2 side. The source side information contains any one or more of all or partial context information of the terminal at the source base station, ability information of the terminal and signaling connection information and assistance information of the terminal at the source base station or a core network.

Specifically, the carried source side information includes but is not limited to all or partial context information of the terminal at the base station 1, such as configuration information of E-RAB in LTE, including E-RAB transport layer address, QoS information, etc.; ability information of the terminal; signaling connection information of the terminal at the base station 1 or a core network and some other assistance information, for assisting the base station 2 in completing the associated configuration, such as a target cell of a connection point desired by the terminal, RRM information of the terminal, measurement information, the current measurement configuration, etc.

In step 502, after receiving the base station adding request sent by the base station 1, the base station 2 first performs acceptance control and checks whether there are enough resources to accept a service of the multi-connected terminal, if yes, the subsequent process is executed; otherwise, the base station 2 sends base station adding request response to the base station 1 to inform the base station 1 of the failure of adding the base station. Similar to the first embodiment of the present document, the base station 2 prepares response resources and confirms response configuration, including dedicated physical layer resource confirmation, ground configuration and measurement configuration. After completing the configuration described above, the base station 2 sends the base station adding request response to the base station 1. Unlike the first and second embodiments of the present document, in this embodiment of present document, in addition to preparing the corresponding radio and ground side resources for the accepted service, the base station 2 needs to create at least one new radio signaling bearer for transmitting directly air interface signaling between the base station 2 and the terminal. The base station 2 may generate a radio reconfiguration message based on a radio configuration completion message sent by the base station 1, and then send the base station adding response information which carries the radio reconfiguration message and any one or more of radio configuration information, measurement-related configuration information and ground bearing configuration information of the other base station to the base station 1.

In step 503, after the base station 1 receives the base station adding request response, the base station 1 generates a radio reconfiguration message (such as the existing reusable RRC reconfiguration message of the LTE or a new configuration message) based on the radio configuration of the base station 2 in combination with factors such as radio configuration and reconfiguration situations of the base station 1 and the radio configuration of the current terminal. Optionally, the radio reconfiguration message is sent directly to the terminal via an air interface after it is protected in terms of integrity and is encrypted. If the base station 2 generates a complete radio reconfiguration message in step 402, then the base station 1 may send the radio reconfiguration message, which is optionally protected in terms of integrity and is encrypted, directly to the terminal via the air interface without processing. The radio reconfiguration message carries a service of the terminal required to be transferred to at least one of other base stations, an identifier of the at least one of other base stations and connection information of a newly-added cell, to indicate the terminal to establish a connection with the newly-added cell under the at least one of other base stations and transmit data of the service through the at least one of other base stations after the connection is established.

In step 504, the base station 1 creates a corresponding E-RAB ground bearer and an optional data forward transmission bearer based on the radio configuration sent by the base station 2 in step 503. If there is unsent data which needs to be transmitted forward to the base station 2, the base station 1 will send it to the base station 2 via a forward transmission tunnel and inform the base station 2 of the unfinished data sequence number state via a signaling channel, which is similar to switching in the switching process of the LTE.

In step 505, the terminal accesses randomly the indicated cell according to indication of the radio reconfiguration message and sends a radio reconfiguration completion message to the base station 2 through a radio signaling bearer after accessing successfully. Specifically, the terminal configures the corresponding service and radio bearer according to signaling indication after receiving the radio reconfiguration message sent by the base station 1 in step 503. When the terminal knows this is a multi-connection reconfiguration by a new radio reconfiguration message or an ID configured with respect to a new base station in the radio reconfiguration, the terminal needs to connect with the cell under the new base station. The terminal connects with the newly-added cell according to the connection information indicating the newly-added cell in the configuration, e.g., accesses randomly the newly-added cell after synchronizing with the newly-added cell. As described in step 502, in the embodiment of the present document, the terminal and the base station 2 create the radio signal bearer, and the terminal can send the corresponding reconfiguration completion message to the base station 2 after implementing uplink and downlink synchronization with the cell under the base station 2.

In step 506, the base station confirms success of the air interface process after receiving the reconfiguration completion message of the terminal.

In step 507, the base station 2 sends a path altering request to the base station 1.

In step 508, the base station 1 forwards the path altering request to the corresponding core network or multi-stream gateway.

In step 509, the core network or multi-stream gateway sends a path altering request response to the base station 1 after completing path switching.

In step 510, the base station 1 sends the path altering request response to the base station 2 and at the same time also confirms success of the entire process and updates response configuration to release and migrate to the original resources of the service of the base station 2.

Step 507 to step 510 of this embodiment of the present document, step 307 and step 308 of the first embodiment of the present document, and step 406 and step 407 of the second embodiment of the present document are interchangeable.

The Fourth Embodiment of the Present Document

The embodiment of the present document provides a method for managing multi-connection of a terminal. In the embodiment of the present document, by way of example, a management apparatus is a source base station, a source base station is a base station 1, and the other base station is a base station 2. The base station 1 controls the terminal to establish a connection with the base station 2, and the multi-stream gateway updates a path over which the terminal transmits data to passing through the base station 1 and the base station 2 after the terminal has established the connection with the base station 2.

When the base station 1 acts as the multi-stream gateway, the base station 2 does not need to interact with the multi-stream gateway directly or indirectly any more.

Figure 6:
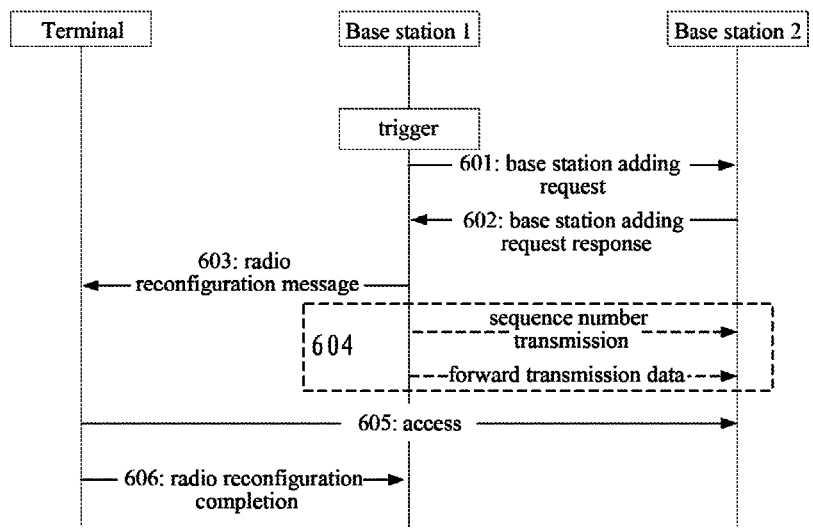
FIG. 6 is a flow chart of a method for managing multi-connection of a terminal in accordance with the fourth embodiment of the present document.

A process where a terminal establishes multiple data transmission paths implemented by using a method for managing multi-connection of the terminal provided by the embodiment of present document is as shown in FIG. 6 and comprises the following steps.

In step 601, the base station 1 sends a base station adding request to the base station 2. The base station adding request carries necessary information used to prepare multi-connection transmission at the base station 2 side. The carried source side information includes but is not limited to all or partial context information of the terminal at the base station 1, such as configuration information of E-RAB in LTE, including E-RAB transport layer address, QoS information, etc.; ability information of the terminal; signaling connection information of the terminal at the base station 1 or a core network and some other assistance information, for assisting the base station 2 in completing the associated configuration, such as a target cell of a connection point desired by the terminal, RRM information of the terminal, measurement information, the current measurement configuration, etc.

In step 602, after receiving the base station adding request sent by the base station 1, the base station 2 first performs acceptance control and checks whether there are enough resources to accept a service of the multi-connected terminal, if yes, the subsequent process is executed; otherwise, the base station 2 sends base station adding request response to the base station 1 to inform the base station 1 of the failure of adding the base station. Similar to the first embodiment of the present document, the base station 2 prepares response resources and confirms response configuration, including dedicated physical layer resource confirmation, ground configuration and measurement configuration. After completing the configuration described above, the base station 2 sends the base station adding request response to the base station 1.

In step 603, after the base station 1 receives the base station adding request response, the base station 1 generates a radio reconfiguration message (such as the existing reusable RRC reconfiguration message of the LTE or a new configuration message) based on the radio configuration of the base station 2 in combination with factors such as radio configuration and reconfiguration situations of the base station 1 and the radio configuration of the current terminal. Optionally, the radio reconfiguration message is sent directly to the terminal via an air interface after it is protected in terms of integrity and is encrypted.

In step 604, the base station 1 creates a corresponding E-RAB ground bearer and an optional data forward transmission bearer based on the radio configuration sent by the base station 2 in step 603. If there is unsent data which needs to be transmitted forward to the base station 2, the base station 1 will send it to the base station 2 via a forward transmission tunnel and inform the base station 2 of the unfinished data sequence number state via a signaling channel, which is similar to switching in the switching process of the LTE.

In step 605, the terminal receives the radio reconfiguration message sent by the base station 1 in step 603 and configures the corresponding service and radio bearer according to signaling indication. When the terminal knows this is a multi-connection reconfiguration by a new radio reconfiguration message or an ID configured with respect to a new base station in the radio reconfiguration, the terminal needs to connect with the cell under the new base station. The terminal connects with the newly-added cell according to the connection information indicating the newly-added cell in the configuration, e.g., accesses randomly the newly-added cell after synchronizing with the newly-added cell.

The specific process of step 601 to step 605 is the same as the implementation principle of step 301 to step 305 in the first embodiment of the present document.

In step 606, the terminal sends a radio reconfiguration completion message to the base station 1 through a radio signaling bearer after accessing randomly the designated cell under the newly-added base station successfully. After receiving the message, the base station 1 confirms that the terminal has completed the reconfiguration. The base station 1 may update the final configuration. If the terminal fails in step 605, it can send a reconfiguration failure message to the base station 1. The base station 1 initiates the subsequent restoration process, deletes the newly-added radio resources and the newly-added ground configuration on the base station 2 and then remains the original ground configuration.

If the above process is successful, the base station 1 itself is the multi-stream gateway, completes path switching internally, forwards the service required to be transferred to the base station 2 in the configuration described above to the base station 2, at the same time receives uplink services from the base station, and releases radio resources and ground resources occupied originally by these services on the base station 1.

The Fifth Embodiment of the Present Document

The embodiment of the present document provides a method for managing multi-connection of a terminal. In the embodiment of the present document, by way of example, a management apparatus is a source base station, a source base station is a base station 1, and the other base station is a base station 2. The base station 1 controls the terminal to establish a connection with the base station 2, and the multi-stream gateway updates a path over which the terminal transmits data to passing through the base station 1 and the base station 2 after the terminal has established the connection with the base station 2.

When the base station 1 acts as the multi-stream gateway, the base station 2 does not need to interact with the multi-stream gateway directly or indirectly any more.

Figure 7:
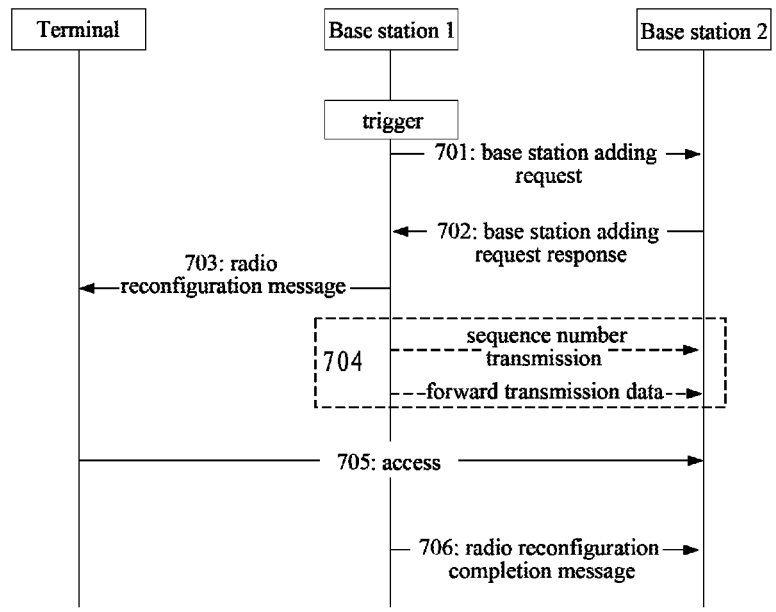
FIG. 7 is a flow chart of a method for managing multi-connection of a terminal in accordance with the fifth embodiment of the present document.

A process where a terminal establishes multiple data transmission paths implemented by using a method for managing multi-connection of the terminal provided by the embodiment of present document is as shown in FIG. 7 and comprises the following steps.

In step 701, the base station 1 sends a base station adding request to the base station 2 after a multi-stream judgement is triggered. The base station adding request carries necessary information to prepare multi-connection transmission at the base station 2 side. The carried source side information includes but is not limited to all or partial context information of the terminal at the base station 1, such as configuration information of E-RAB in LTE, including E-RAB transport layer address, QoS information, etc.; ability information of the terminal; signaling connection information of the terminal at the base station 1 or a core network and some other assistance information, for assisting the base station 2 in completing the associated configuration, such as a target cell of a connection point desired by the terminal, RRM information of the terminal, measurement information, the current measurement configuration, etc.

In step 702, after receiving the base station adding request sent by the base station 1, the base station 2 first performs acceptance control and checks whether there are enough resources to accept a service of the multi-connected terminal, if yes, the subsequent process is executed; otherwise, the base station 2 sends base station adding request response to the base station 1 to inform the base station 1 of the failure of adding the base station. Similar to the first embodiment of the present document, the base station 2 prepares response resources and confirms response configuration, including dedicated physical layer resource confirmation, ground configuration and measurement configuration. After completing the configuration described above, the base station 2 sends the base station adding request response to the base station 1.

In step 703, after the base station 1 receives the base station adding request response, the base station 1 generates a radio reconfiguration message (such as the existing reusable RRC reconfiguration message of the LTE or a new configuration message) based on the radio configuration of the base station 2 in combination with factors such as radio configuration and reconfiguration situations of the base station 1 and the radio configuration of the current terminal. Optionally, the radio reconfiguration message is sent directly to the terminal via an air interface after it is protected in terms of integrity and is encrypted.

In step 704, the base station 1 creates a corresponding E-RAB ground bearer and an optional data forward transmission bearer based on the radio configuration sent by the base station 2 received in step 703. If there is unsent data which needs to be transmitted forward to the base station 2, the base station 1 will send it to the base station 2 via a forward transmission tunnel and inform the base station 2 of the unfinished data sequence number state via a signaling channel, which is similar to switching in the switching process of the LTE.

In step 705, the terminal receives the radio reconfiguration message sent by the base station 1 in step 703 and configures the corresponding service and radio bearer according to signaling indication. When the terminal knows this is a multi-connection reconfiguration by a new radio reconfiguration message or an ID configured with respect to a new base station in the radio reconfiguration, the terminal needs to connect with the cell under the new base station. The terminal connects with the newly-added cell according to the connection information indicating the newly-added cell in the configuration, e.g., accesses randomly the newly-added cell after synchronizing with the newly-added cell.

The specific process of step 701 to step 705 is the same as the implementation principle of step 301 to step 405 in the second embodiment of the present document.

In step 706, the terminal sends a radio reconfiguration completion message to the base station 1, notifies the base station 1 that the reconfiguration is completed, releases the resources and switches the path. After receiving the radio reconfiguration completion message, the base station 1 confirms that the terminal has completed the reconfiguration. The base station 1 may update the final configuration. If the terminal fails in step 705, it can send a reconfiguration failure message to the base station 1 directly. The base station 1 initiates the subsequent restoration process, deletes the newly-added radio resources and the newly-added ground configuration on the base station 2 and then remains the original ground configuration.

If the above process is successful, the base station 1 itself is the multi-stream gateway, completes path switching internally, forwards the service required to be transferred to the base station 2 in the configuration described above to the base station 2, at the same time receives uplink services from the base station, and releases radio resources and ground resources occupied originally by these services on the base station 1.

The Sixth Embodiment of the Present Document

The embodiment of the present document provides a method for managing multi-connection of a terminal. In the embodiment of the present document, by way of example, a management apparatus is a source base station, a source base station is a base station 1, and the other base station is a base station 2. The base station 1 controls the terminal to establish a connection with the base station 2, and the multi-stream gateway updates a path over which the terminal transmits data to passing through the base station 1 and the base station 2 after the terminal has established the connection with the base station 2.

When the base station 1 acts as the multi-stream gateway, the base station 2 does not need to interact with the multi-stream gateway directly or indirectly any more.

Figure 8:
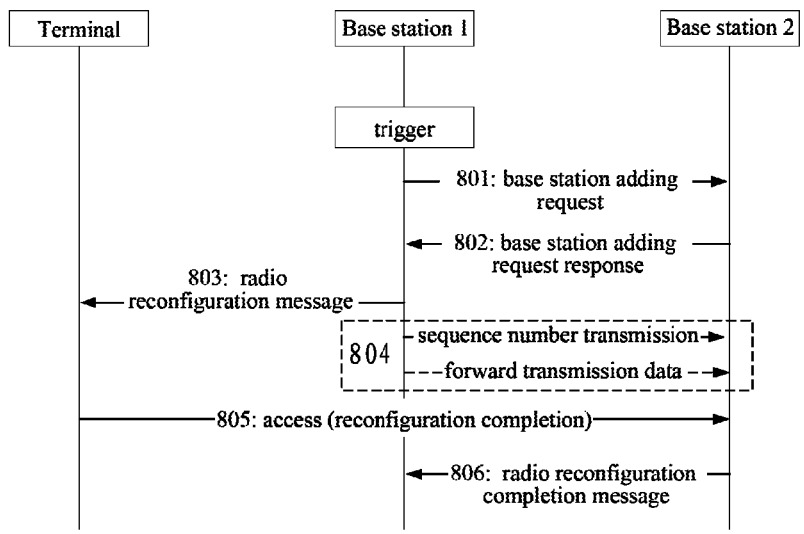
FIG. 8 is a flow chart of a method for managing multi-connection of a terminal in accordance with the sixth embodiment of the present document.

A process where a terminal establishes multiple data transmission paths implemented by using a method for managing multi-connection of the terminal provided by the embodiment of present document is as shown in FIG. 8 and comprises the following steps.

In step 801, the base station 1 sends a base station adding request to the base station 2. The base station adding request carries necessary information to prepare multi-connection transmission at the base station 2 side. The carried source side information includes but is not limited to all or partial context information of the terminal at the base station 1, such as configuration information of E-RAB in LTE, including E-RAB transport layer address, QoS information, etc.; ability information of the terminal; signaling connection information of the terminal at the base station 1 or a core network and some other assistance information, for assisting the base station 2 in completing the associated configuration, such as a target cell of a connection point desired by the terminal, RRM information of the terminal, measurement information, the current measurement configuration, etc.

In step 802, after receiving the base station adding request sent by the base station 1, the base station 2 first performs acceptance control and checks whether there are enough resources to accept a service of the multi-connected terminal, if yes, the subsequent process is executed; otherwise, the base station 2 sends base station adding request response to the base station 1 to inform the base station 1 of the failure of adding the base station. Similar to the first embodiment of the present document, the base station 2 prepares response resources and confirms response configuration, including dedicated physical layer resource confirmation, ground configuration and measurement configuration, etc. After completing the configuration described above, the base station 2 sends the base station adding request response to the base station 1. Unlike the first and second embodiments of the present document, in this embodiment of present document, in addition to preparing the corresponding radio and ground side resources for the accepted service, the base station 2 needs to create at least one new radio signaling bearer for transmitting directly air interface signaling between the base station 2 and the terminal. The base station 2 may generate a radio reconfiguration message based on a radio configuration completion message sent by the base station 1, and send the corresponding message to the base station 1.

In step 803, after the base station 1 receives the base station adding request response, the base station 1 generates a radio reconfiguration message (such as the existing reusable RRC reconfiguration message of the LTE or a new configuration message) based on the radio configuration of the base station 2 in combination with factors such as radio configuration and reconfiguration situations of the base station 1 and the radio configuration of the current terminal. Optionally, the radio reconfiguration message is sent directly to the terminal via an air interface after it is protected in terms of integrity and is encrypted. If the base station 2 generates a radio reconfiguration message in step 802, then the base station 1 may not process the radio reconfiguration message, which is sent directly to the terminal via the air interface after it is optionally protected in terms of integrity and is encrypted.

In step 804, the base station 1 creates a corresponding E-RAB ground bearer and an optional data forward transmission bearer based on the radio configuration sent by the base station 2 received in step 803. If there is unsent data which needs to be transmitted forward to the base station 2, the base station 1 will send it to the base station 2 via a forward transmission tunnel and inform the base station 2 of the unfinished data sequence number state via a signaling channel, which is similar to switching in the switching process of the LTE.

In step 805, after the terminal receives the radio reconfiguration message sent by the base station 1 in step 803, the terminal configures the corresponding service and radio bearer according to signaling indication. When the terminal knows this is a multi-connection reconfiguration by a new radio reconfiguration message or an ID configured with respect to a new base station in the radio reconfiguration, the terminal needs to connect with the cell under the new base station. The terminal connects with the newly-added cell according to the connection information indicating the newly-added cell in the configuration, e.g., accesses randomly the newly-added cell after synchronizing with the newly-added cell. As described in step 802, in the embodiment of the present document, the terminal and the base station 2 create the radio signal bearer, and the terminal can send the corresponding reconfiguration completion message to the base station 2 after implementing uplink and downlink synchronization with the cell under the base station 2.

The specific process of step 801 to step 805 is the same as the implementation principle of step 501 to step 505 in the third embodiment of the present document.

In step 806, the terminal informs the base station 1 of completion of the reconfiguration after receiving a radio reconfiguration completion message, and releases resources and switches the path. After receiving the radio reconfiguration completion message, the base station 1 confirms that the terminal has completed the reconfiguration. The base station 1 may update the final configuration. If the terminal fails in step 805, it can send a reconfiguration failure message to the base station 1. The base station 1 initiates the subsequent restoration process, deletes the newly-added radio resources and the newly-added ground configuration on the base station 2 and then remains the original ground configuration.

If the above process is successful, the base station 1 itself is the multi-stream gateway, completes path switching internally, forwards the service required to be transferred to the base station 2 in the configuration described above to the base station 2, at the same time receives uplink services from the base station, and releases radio resources and ground resources occupied originally by these services on the base station 1.

The Seventh Embodiment of the Present Document

Figure 9:
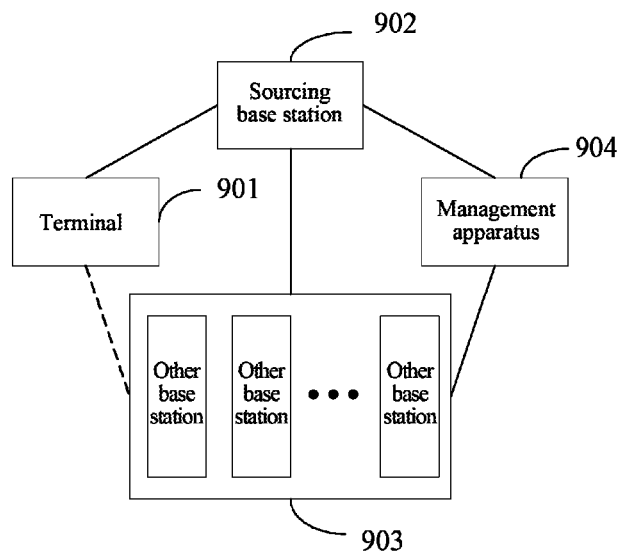
FIG. 9 is a schematic diagram of a system for managing multi-connection of a terminal in accordance with the seventh embodiment of the present document.

The embodiment of the present document provides a system for managing multi-connection of a terminal, the structure of which is as shown in FIG. 9 and comprises a terminal 901, a source base station 902 where the terminal 901 is located, at least one of other base stations 903 and a management apparatus 904.

The source base station 902 is configured to control the terminal 901 to establish a connection with the at least one of other base stations 903.

The management apparatus 904 is configured to update a path over which the terminal 901 transmits data to passing through the source base station 902 and the at least one of other base stations 903 after the terminal 901 has established the connection with the at least one of other base stations 903.

Preferably, the management apparatus 904 is specifically the source base station 902 or a multi-stream gateway or a core network. Specifically, the management apparatus 904 may be an independent device, i.e., a multi-stream gateway which is a device independent of the terminal and the source base station. The management apparatus 904 may be further integrated into other network elements, such as a gateway of a core network. The management apparatus 904 may be further integrated into the source base station 902, which carries out corresponding functions.

Preferably, the source base station 902 is specifically configured to acquire corresponding information from the at least one of other base stations 903 to generate a radio reconfiguration message and send the radio reconfiguration message to the terminal 901, indicate the terminal 903 to access a newly-added cell under the at least one of other base stations 903.

The terminal 901 is configured to access randomly the indicated newly-added cell according to indication of the radio reconfiguration message and send a radio reconfiguration completion message to the source base station 902 through a radio signaling bearer after accessing successfully.

Preferably, the source base station 902 is specifically configured to send a base station adding request to the at least one of other base stations 903, the base station adding request carries source side information which contains any one or more of the following: all or partial context information of the terminal 901 at the source base station 902, ability information of the terminal 901 and signaling connection information and assistance information of the terminal 901 at the source base station 902 or a core network;

and generate a radio reconfiguration message according to the radio configuration information sent by the other base station 903 and send the radio reconfiguration message, which carries a service of the terminal 901 required to be transferred to the at least one of other base stations 903, an identifier of the at least one of other base stations 903 and connection information of the newly-added cell, to the terminal 901 through an air interface, indicate the terminal 901 to establish a connection with the newly-added cell under the at least one of other base stations 903 and transmit data of the service through the at least one of other base stations 903 after the connection is established.

Any one of the other base stations 903 is configured to send base station adding request response information to the source base station 902 after receiving the base station adding request, the base station adding request response carries the radio configuration information which contains any one or more of the following: dedicated radio resource allocation information, public radio configuration information, measurement-related configuration information and ground bearing configuration information of the other base station 903.

Preferably, the source base station 902 is configured to acquire corresponding information from the at least one of other base stations 903 to generate a radio reconfiguration message and send the radio reconfiguration message to the terminal 901, indicate the terminal 901 to access a newly-added cell under the at least one of other base stations 903.

The terminal 901 is configured to receive the radio reconfiguration message and access randomly the newly-added cell according to the radio reconfiguration message.

Preferably, the source base station 902 is configured to send a base station adding request to the at least one of other base stations 903, the base station adding request carries source side information which contains any one or more of the following: all or partial context information of the terminal 901 at the source base station 902, ability information of the terminal 901 and signaling connection information and assistance information of the terminal 901 at the source base station 902 or a core network, and generate a radio reconfiguration message according to the radio configuration information sent by the other base station 903 and send the radio reconfiguration message, which carries a service of the terminal 901 required to be transferred to the at least one of other base stations 903, an identifier of the at least one of other base stations 903 and connection information of the newly-added cell, to the terminal 901 through an air interface, indicate the terminal 901 to establish a connection with the newly-added cell under the at least one of other base stations 903 and transmits data of the service through the at least one of other base stations 903 after the connection is established.

Any one of the other base stations 903 is configured to send base station adding request response to the source base station 902 after receiving the base station adding request, the base station adding request response carries the radio configuration information which contains any one or more of the following: dedicated radio resource allocation information, public radio configuration information, measurement-related configuration information and ground bearing configuration information of the other base station 903.

Preferably, any one of the other base stations 903 is further configured to send a path altering request to the management apparatus 904 after confirming that the terminal 901 has established the connection with the other base station 903 successfully and send the path altering request to the management apparatus 904, the path altering request carries an ID number of a service, the path of which is required to be altered, and/or an ID of a ground bearer resource.

The management apparatus 904 is configured to newly create a ground data bearer with the other base station 903 and send a path altering request response message to the other base station 903.

Preferably, the management apparatus 904 is configured to complete path switching for the terminal 901 internally and newly create the ground data bearer with the other base station 903 after confirming that the terminal 901 has established the connection with the other base station 903 successfully.

Preferably, the source base station 902 is configured to acquire the radio reconfiguration message and send the radio reconfiguration message to the terminal 901, indicate the terminal 901 to access the newly-added cell under the at least one of other base stations 903.

The terminal 901 is configured to access randomly the indicated newly-added cell according to indication of the radio reconfiguration message and send a radio reconfiguration completion message to the other base station 903 corresponding to the randomly accessed newly-added cell through a radio signaling bearer after accessing successfully.

Preferably, the source base station 902 is specifically configured to send a base station adding request to the at least one of other base stations 903, the base station adding request carries source side information which contains: all or partial context information of the terminal 901 at the source base station 902, ability information of the terminal 901 and signaling connection information and assistance information of the terminal 901 at the source base station 902 or a core network.

Any one of the other base stations 903 is configured to create a new radio signaling bearer for a service of the terminal 901 to be accepted after receiving the base station adding request and generate a radio reconfiguration message, and send the radio reconfiguration message, which carries a service of the terminal 901 required to be transferred to the at least one of other base stations 903, an identifier of the at least one of other base stations 903 and connection information of the newly-added cell, to the terminal 901 through an air interface according to the radio configuration information sent by the other base station 903, indicate the terminal 901 to establish a connection with the newly-added cell under the at least one of other base stations 903 and transmit data of the service through the at least one of other base stations 903 after the connection is established.

The other base station 903 is configured to send base station adding request response to the source base station 902, the base station adding request response carries the radio configuration information and the radio reconfiguration message, the radio configuration information contains dedicated radio resource allocation information, public radio configuration information, measurement-related configuration information and ground bearing configuration information of the other base station 903.

Preferably, any one of the other base stations 903 is further configured to send a path altering request to the source base station 902 after confirming that the terminal 901 has established the connection with the other base station 903 successfully, the path altering request carries an ID number of a service, the path of which is required to be altered, and/or an ID of a ground bearer resource.

The source base station 902 is further configured to forward the path altering request to the management apparatus 904.

The management apparatus 904 is configured to newly create a ground data bearer with the other base station 903 and send a path altering request response message to the source base station 902.

Preferably, any one of the other base stations 903 is configured to forward a radio reconfiguration completion message sent by the terminal 901 after receiving the radio reconfiguration completion message.

The management apparatus 904 is configured to complete path switching for the terminal 901 internally and newly create the ground data bearer with the other base station 903 after confirming that the terminal 901 has established the connection with the other base station 903 successfully.

Preferably, the source base station 902 is further configured to create corresponding ground bearers according to the ground bearing configuration and create a corresponding data forward transmission bearer after receiving the base station adding request response sent by the other base station 903.

Figure 10:
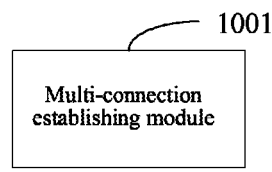
FIG. 10 is a schematic diagram of a device for managing multi-connection of a terminal in accordance with the seventh embodiment of the present document.

A embodiment of present document further provides a device for managing multi-connection of a terminal, the structure of which is as shown in FIG. 10 and comprises:

a multi-connection establishing module 1001, configured to accept control of a source base station to establish a connection with at least one of other base stations.

Figure 11:
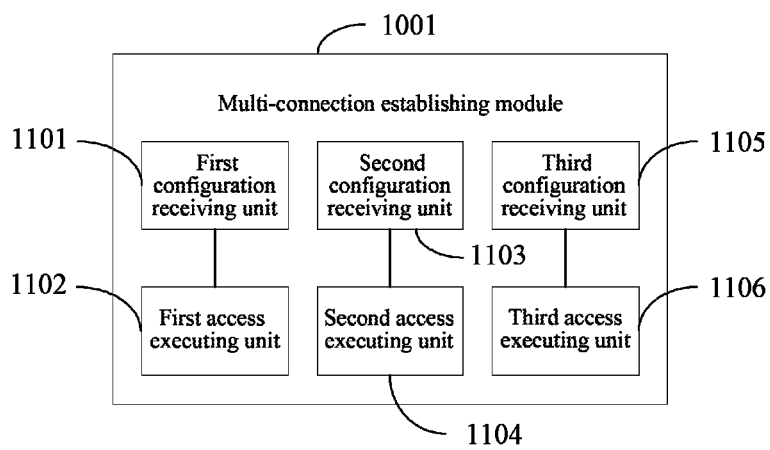
FIG. 11 is a schematic diagram of a multi-connection establishing module 1001 in FIG. 10.

Preferably, the multi-connection establishing module 1001 is as shown in FIG. 11 and comprises:

a first configuration receiving unit 1101, configured to receive a radio reconfiguration message sent by the source base station, wherein the radio reconfiguration message indicates the terminal to access a newly-added cell under the at least one of other base stations; and a first access executing unit 1102, configured to access randomly the newly-added cell according to indication of the radio reconfiguration message and send a radio reconfiguration completion message to the source base station through a radio signaling bearer after accessing successfully.

Figure 12:
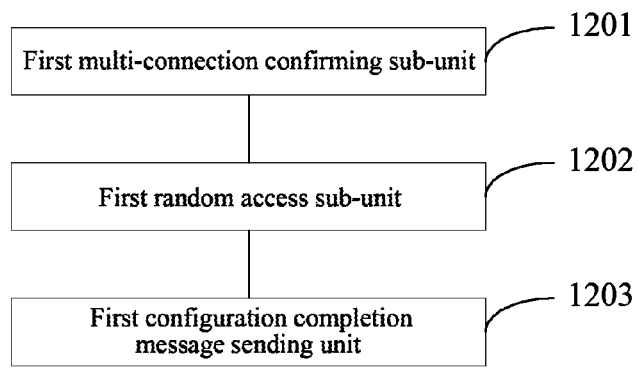
FIG. 12 is a schematic diagram of a first access executing unit 1101 in FIG. 11.

Preferably, the first access executing unit 1102 is shown in FIG. 12 and comprises:

a first multi-connection confirming sub-unit 1201, configured to determine that the radio reconfiguration message is a radio reconfiguration message indicating multi-connection by a new radio reconfiguration message or a multi-connection identifier configured with respect to a new base station in the radio reconfiguration message;

a first random access sub-unit 1202, configured to access randomly the newly-added cell according to the indication of the radio reconfiguration message; and a first configuration completion message sending unit 1203, configured to send the radio reconfiguration completion message to the source base station through a radio signaling bearer after the newly-added cell has been accessed randomly successfully.

Preferably, the multi-connection establishing module 1001 further comprises:

a second configuration receiving unit 1103, configured to receive a radio reconfiguration message sent by the source base station, wherein the radio reconfiguration message indicates the terminal to access a newly-added cell under the at least one of other base stations; and a second access executing unit 1104, configured to access randomly the newly-added cell according to the radio reconfiguration message.

Figure 13:
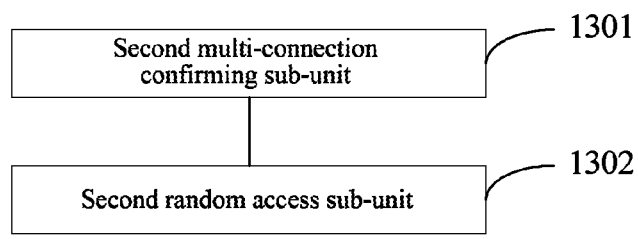
FIG. 13 is a schematic diagram of a second access executing unit 1104 in FIG. 11.

Preferably, the second access executing unit 1104 is shown in FIG. 13 and comprises:

a second multi-connection confirming sub-unit 1301, configured to determine that the radio reconfiguration message is a radio reconfiguration message indicating multi-connection by a new radio reconfiguration message or a multi-connection identifier configured with respect to a new base station in the radio reconfiguration message; and a second random access sub-unit 1302, configured to access randomly the newly-added cell according to the indication of the radio reconfiguration message.

Preferably, the multi-connection establishing module 1001 further comprises:

a third configuration receiving unit 1105, configured to receive a radio reconfiguration message sent by the source base station, wherein the radio reconfiguration message indicates the terminal accesses a newly-added cell under the at least one of other base stations; and a third access executing unit 1106, configured to access randomly the newly-added cell according to indication of the radio reconfiguration message and send a radio reconfiguration completion message to the other base station corresponding to the randomly accessed newly-added cell through a radio signaling bearer after accessing successfully.

Figure 14:
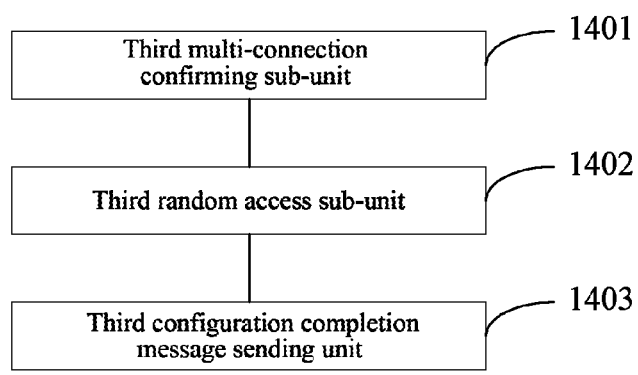
FIG. 14 is a schematic diagram of a third access executing unit 1106 in FIG. 11.

Preferably, the third access executing unit 1106 is shown in FIG. 14 and comprises:

a third multi-connection confirming sub-unit 1401, configured to determine that the radio reconfiguration message is a radio reconfiguration message indicating multi-connection by a new radio reconfiguration message or a multi-connection identifier configured with respect to a new base station in the radio reconfiguration message;

a third random access sub-unit 1402, configured to access randomly the newly-added cell according to the indication of the radio reconfiguration message; and a third configuration completion message sending unit 1403, configured to send the radio reconfiguration completion message to the other base station through the radio signaling bearer after the terminal has successfully accessed randomly the newly-added cell.

The device for managing multi-connection of the terminal provided by the embodiments of the present document may be integrated into the terminal side, and its corresponding functions are completed by the terminal.

People having ordinary skill in the art may understand that all or part of steps in the embodiments described above can be carried out by computer program processes, which can be stored in a computer readable storage medium. The computer programs, when executed on the corresponding hardware platform (such as system, device, apparatus and component), include one of steps or their combination in the method embodiments.

Optionally, all or part of steps in the embodiments described above can be carried out using integrated circuits. These steps can be made into individual integrated circuit modules, or a plurality of modules or steps thereof can be made into a single integrated circuit, to implement. Thus, the present document is not limited to the combination of any specific hardware and software.

Each apparatus/functional module/functional unit in the embodiments described above, which can be implemented by using general computing apparatuses, can be centralized on a single computing apparatus or distributed on a network composed of multiple computing apparatus.

Each apparatus/functional module/functional unit in the embodiments described above, when implemented in a form of software functional module and sold or used as a standstone product, can be stored in a computer readable storage medium. The computer readable storage medium mentioned above may be read-only memory, magnetic disk or optical disk, etc.

Any person skilled in the art can easily conceive variations or substitutions within the technical scope disclosed by the present document, which should be covered within the protect scope of the present document. Therefore, the protect scope of the present document should be subject to the protect scope described by the claims.

INDUSTRIAL APPLICABILITY

Embodiments of the present document provide a method, device and system for managing multi-connection of a terminal, a source base station of a terminal controls the terminal to establish a connection with at least one of other base stations and updates a path over which the terminal transmits data to passing through the source base station and the at least one of other base stations after the terminal has established the connection with the at least one of other base stations, thereby implementing the management for the multi-connection of the terminal and solving the problem of managing the multi-connection existing between the terminal and multiple base stations.

What is claimed is:

1. A method for managing multi-connection of a terminal, comprising:
 a source base station of a terminal controlling the terminal to establish a connection with at least one of other base stations; and
 updating a path over which the terminal transmits data to passing through the source base station and the at least one of other base stations after the terminal has established the connection with the at least one of other base stations;
 wherein the updating a path over which the terminal transmits data to passing through the source base station and the at least one of other base stations after the terminal has established the connection with the at least one of other base stations comprises:
 any one of the other base stations sending a path altering request to the source base station after confirming that the terminal has established the connection with the at least one of the other base stations successfully, the path altering request carrying an identification number of a service, the path of which is required to be altered, and/or an identification of a ground bearer resource;
 the source base station forwarding the path altering request to a corresponding core network or multistream gateway; and
 the core network or multi-stream gateway newly creating a ground data bearer with the any of the other base stations and sending a path altering request response message to the source base station.

2. The method for managing multi-connection of a terminal according to claim 1, wherein the source base station of the terminal controlling the terminal to access at least one of other base stations to establish a connection comprises:
 the source base station acquiring corresponding information from the at least one of other base stations to generate a radio reconfiguration message and send the radio reconfiguration message to the terminal, indicating the terminal to access a newly-added cell under the at least one of other base stations; and
 the terminal accessing randomly the indicated newly-added cell according to indication of the radio reconfiguration message and sending a radio reconfiguration completion message to the source base station through a radio signaling bearer after accessing successfully.

3. The method for managing multi-connection of a terminal according to claim 2, wherein the source base station acquiring corresponding information from the at least one of other base stations to generate a radio reconfiguration message and send the radio reconfiguration message to the terminal comprises:
 the source base station sending a base station adding request to the at least one of other base stations, the base station adding request carrying source side information which contains any one or more of the following: all or partial context information of the terminal at the source base station, ability information of the terminal, and signaling connection information and assistance information of the terminal at the source base station or a core network;
 any one of the other base stations sending base station adding response information to the source base station after receiving the base station adding request, the base station adding response information carrying any one or more of the following: radio configuration information, measurement-related configuration information, and ground bearing configuration information of the other base station;
 the source base station generating a radio reconfiguration message according to the base station adding response information sent by the other base station, sending the radio reconfiguration message, which carries a service of the terminal required to be transferred to the at least one of other base stations, an identifier of the at least one of other base stations and connection information of the newly-added cell, to the terminal through an air interface, indicating the terminal to establish a connection with the newly-added cell under the at least one of other base stations and transmit data of the service through the at least one of other base stations after the connection is established.

4. The method for managing multi-connection of a terminal according to claim 3, wherein the terminal accessing randomly the indicated newly-added cell according to indication of the radio reconfiguration message and sending a radio reconfiguration completion message to the source base station through a radio signaling bearer after accessing successfully comprises:
 the terminal determining that the radio reconfiguration message is a radio reconfiguration message indicating multi-connection by a new radio reconfiguration message or a multi-connection identifier configured with respect to a new base station in the radio reconfiguration message;
 the terminal accessing randomly the newly-added cell according to the indication of the radio reconfiguration message; and the terminal sending the radio reconfiguration completion message to the source base station through the radio signaling bearer after the terminal has successfully accessed randomly the newly-added cell.

5. The method for managing multi-connection of a terminal according to claim 2, wherein the source base station of the terminal controlling the terminal to access a newly-added cell under the at least one of other base stations further comprises:

the source base station establishing corresponding ground bearers according to the ground bearer configuration after receiving a base station adding response information sent by the other base station.

6. The method for managing multi-connection of a terminal according to claim 5, wherein the source base station of the terminal controlling the terminal to access at least one of other base stations to establish a connection further comprises:

the source base station further establishing a corresponding data forward transmission bearer.

7. The method for managing multi-connection of a terminal according to claim 2, wherein after the step of the source base station generating a radio reconfiguration message according to the radio configuration information sent by the at least one of the other base stations, sending the radio reconfiguration message to the terminal through an air interface, indicating the terminal to establish a connection with the newly-added cell under the at least one of other base stations, the method further comprises:

the terminal sending a reconfiguration failure message to the source base station after the terminal fails to access.

8. The method for managing multi-connection of a terminal according to claim 7, wherein after the step of the terminal sending a reconfiguration failure message to the source base station after the terminal fails to access, the method further comprises:

the source base station remaining original ground configuration, initiating a subsequent recovery process, and deleting newly-added radio resource configuration and newly-added ground configuration on the at least one of other base stations.

9. The method for managing multi-connection of a terminal according to claim 1, wherein the source base station of the terminal controlling the terminal to access a newly-added cell under the at least one of other base stations comprises:

the source base station acquiring a radio reconfiguration message and sending the radio reconfiguration message to the terminal, indicating the terminal to access the newly-added cell under the at least one of other base stations; and the terminal accessing randomly the indicated newly-added cell according to indication of the radio reconfiguration message and sending a radio reconfiguration completion message to the at least one of the other base stations corresponding to the randomly accessed newly-added cell through a radio signaling bearer after accessing successfully.

10. The method for managing multi-connection of a terminal according to claim 9, wherein the source base station acquiring the radio reconfiguration message and sending the radio reconfiguration message to the terminal, indicating the terminal to access the newly-added cell under the at least one of other base stations comprises:

the source base station sending a base station adding request to the at least one of other base stations, the base station adding request carrying source side information which contains: all or partial context information of the terminal at the source base station, ability information of the terminal and signaling connection information and assistance information of the terminal at the source base station or a core network;

any one of the other base stations establishing a new radio signaling bearer for a service of the terminal to be accepted after receiving the base station adding request, and generating a radio reconfiguration message;

the at least one of the other base stations sending base station adding response information to the source base station, the base station adding response information carrying the radio reconfiguration message and any one or more of the following: radio configuration information, measurement-related configuration information and ground bearing configuration information of the at least one of the other base stations;

the source base station sending the radio reconfiguration message, which carries a service of the terminal required to be transferred to the at least one of other base stations, an identifier of the at least one of other base stations and connection information of the newly-added cell, to the terminal through an air interface according to the radio configuration information sent by the at least one of the other base stations, indicating the terminal to establish a connection with the newly-added cell under the at least one of other base stations and transmit data of the service through the at least one of other base stations after the connection is established.

11. The method for managing multi-connection of a terminal according to claim 10, wherein the terminal accessing randomly the indicated newly-added cell according to indication of the radio reconfiguration message and sending a radio reconfiguration completion message to the at least one of the other base stations corresponding to the randomly accessed newly-added cell through a radio signaling bearer after accessing successfully comprises:

the terminal determining that the radio reconfiguration message is a radio reconfiguration message indicating multi-connection by a new radio reconfiguration message or a multi-connection identifier configured with respect to a new base station in the radio reconfiguration message;

the terminal accessing randomly the newly-added cell according to the indication of the radio reconfiguration message; and the terminal sending the radio reconfiguration completion message to the at least one of the other base stations through the radio signaling bearer after the terminal has successfully accessed randomly the newly-added cell.

12. The method for managing multi-connection of a terminal according to claim 10, wherein the source base station of the terminal controlling the terminal to access a newly-added cell under the at least one of other base stations further comprises:

the source base station establishing corresponding ground bearers according to the ground bearer configuration after receiving the base station adding response information sent by the other base station.

13. The method for managing multi-connection of a terminal according to claim 12, wherein the source base station of the terminal controlling the terminal to access a newly-added cell under the at least one of other base stations further comprises:

the source base station further establishing a corresponding data forward transmission bearer.

14. The method for managing multi-connection of a terminal according to claim 1, wherein before the source base station of the terminal controlling the terminal to establish a connection with at least one of other base stations, the method further comprises:

the source base station triggering a process of adding one or more other base stations for the terminal to perform multi-connection transmission.

15. The method for managing multi-connection of a terminal according to claim 1, wherein a source base station of a terminal controlling the terminal to establish a connection with at least one of other base stations comprises:

the terminal receiving a radio reconfiguration message sent by the source base station, the radio reconfiguration message indicating the terminal to access a newly-added cell under the at least one of other base stations; and the terminal accessing randomly the newly-added cell according to indication of the radio reconfiguration message and sending a radio reconfiguration completion message to the at least one of the other base stations corresponding to the randomly accessed newly-added cell through a radio signaling bearer after accessing successfully.

16. The method for managing multi-connection of a terminal according to claim 15, wherein the terminal accessing randomly the newly-added cell according to indication of the radio reconfiguration message and sending a radio reconfiguration completion message to the at least one of the other base stations corresponding to the randomly accessed newly-added cell through a radio signaling bearer after accessing successfully comprises:

the terminal determining that the radio reconfiguration message is a radio reconfiguration message indicating multi-connection by a new radio reconfiguration message or a multi-connection identifier configured with respect to a new base station in the radio reconfiguration message;

the terminal accessing randomly the newly-added cell according to the indication of the radio reconfiguration message; and the terminal sending the radio reconfiguration completion message to the at least one of other base stations through the radio signaling bearer after the terminal has successfully accessed randomly the newly-added cell.

17. A system for managing multi-connection of a terminal, comprising a terminal, a source base station where the terminal is located, at least one of other base stations and a management apparatus, wherein the source base station is configured to control the terminal to establish a connection with the at least one of other base stations; and the management apparatus is configured to update a path over which the terminal transmits data to passing through the source base station and the at least one of other base stations after the terminal has established the connection with the at least one of other base stations;

wherein any one of the other base stations is further configured to send a path altering request to the source base station after confirming that the terminal has established the connection with the at least one of the other base stations successfully, wherein the path altering request carries an identification number of a service, the path of which is required to be altered, and/or an identification of a ground bearer resource;

the source base station is further configured to forward the path altering request to the management apparatus; and the management apparatus is configured to newly create a ground data bearer with the any of the other base stations and send a path altering request response message to the source base station.

18. The system for managing multi-connection of a terminal according to claim 17, wherein the management apparatus is the source base station or a multi-stream gateway or a core network.

19. A device for managing multi-connection of a terminal, comprising:

a non-transitory computer readable storage medium;

a processor coupled to the non-transitory computer readable storage medium, executing a multi-connection establishing module to accept control of a source base station to establish a connection with at least one of other base stations;

wherein a path over which the terminal transmits data is updated to passing through the source base station and the at least one of other base stations after the terminal has established the connection with the at least one of other base stations;

wherein any one of the other base stations sends a path altering request to the source base station after confirming that the terminal has established the connection with the at least one of the other base stations successfully, and the path altering request carries an identification number of a service, the path of which is required to be altered, and/or an identification of a ground bearer resource;

wherein the source base station forwards the path altering request to a corresponding core network or multi-stream gateway;

wherein the core network or multi-stream gateway newly creates a ground data bearer with the any of the other base stations and sends a path altering request response message to the source base station.

20. The device for managing multi-connection of a terminal according to claim 19, wherein the multi-connection establishing module comprises:

a first configuration receiving unit, configured to receive a radio reconfiguration message sent by the source base station, wherein the radio reconfiguration message indicates the terminal to access a newly-added cell under the at least one of other base stations; and a first access executing unit, configured to access randomly the newly-added cell according to indication of the radio reconfiguration message and send a radio reconfiguration completion message to the source base station through a radio signaling bearer after accessing successfully.

* * * * *